(12) United States Patent
Takagi

(10) Patent No.: US 12,510,493 B2
(45) Date of Patent: Dec. 30, 2025

(54) FLUOROSCOPIC IMAGE CAPTURING APPARATUS

(71) Applicant: Hitachi High-Tech Corporation, Tokyo (JP)

(72) Inventor: Hiroyuki Takagi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 220 days.

(21) Appl. No.: 18/281,699

(22) PCT Filed: Mar. 1, 2022

(86) PCT No.: PCT/JP2022/008620
§ 371 (c)(1),
(2) Date: Sep. 12, 2023

(87) PCT Pub. No.: WO2022/219946
PCT Pub. Date: Oct. 20, 2022

(65) Prior Publication Data
US 2024/0151659 A1 May 9, 2024

(30) Foreign Application Priority Data
Apr. 15, 2021 (JP) ................... 2021-068815

(51) Int. Cl.
*G01N 23/04* (2018.01)
(52) U.S. Cl.
CPC ... *G01N 23/043* (2013.01); *G01N 2223/3032* (2013.01); *G01N 2223/406* (2013.01)
(58) Field of Classification Search
CPC ............. G01N 23/04; G01N 23/043; G01N 2223/3032; G01N 2223/406
See application file for complete search history.

(56) References Cited

U.S. PATENT DOCUMENTS

| 2004/0081279 A1 | 4/2004 | Brunnett |
| 2013/0230139 A1 | 9/2013 | Morton |
| 2016/0282286 A1 | 9/2016 | Mashita et al. |

FOREIGN PATENT DOCUMENTS

| JP | 62-91845 A | 4/1987 |
| JP | 2005-283180 A | 10/2005 |

(Continued)

OTHER PUBLICATIONS

International Search Report of PCT/JP2022/008620 dated May 24, 2022.

(Continued)

*Primary Examiner* — Jurie Yun
(74) *Attorney, Agent, or Firm* — MATTINGLY & MALUR, PC

(57) ABSTRACT

In a fluoroscopic image capturing apparatus, an internal structure of a specimen can be appropriately evaluated. To provide a fluoroscopic image capturing apparatus 1 including: a timing control device 13 configured to output an irradiation timing signal S1 in synchronization with a drive timing signal S4 for driving a specimen 31 or a timing signal S5 as a detection result of an operation of the specimen 31; electromagnetic wave generation units 22 and 23 configured to irradiate, in synchronization with the irradiation timing signal Si, the specimen 31 with a pulsed electromagnetic wave beam B1 having a wavelength with which the electromagnetic wave beam B1 is transmitted through the specimen 31; and an electromagnetic wave detection device 41 configured to receive the electromagnetic wave beam B1 transmitted through the specimen 31.

4 Claims, 3 Drawing Sheets

(56) References Cited

FOREIGN PATENT DOCUMENTS

| | | |
|---|---|---|
| JP | 2006-503631 A | 2/2006 |
| JP | 2011-089798 A | 5/2011 |
| JP | 2015-512033 A | 4/2015 |
| JP | 2015-096839 A | 5/2015 |

OTHER PUBLICATIONS

Written Opinion of the International Searching Authority PCT/JP2022/008620 dated May 24, 2022.

[FIG. 1]
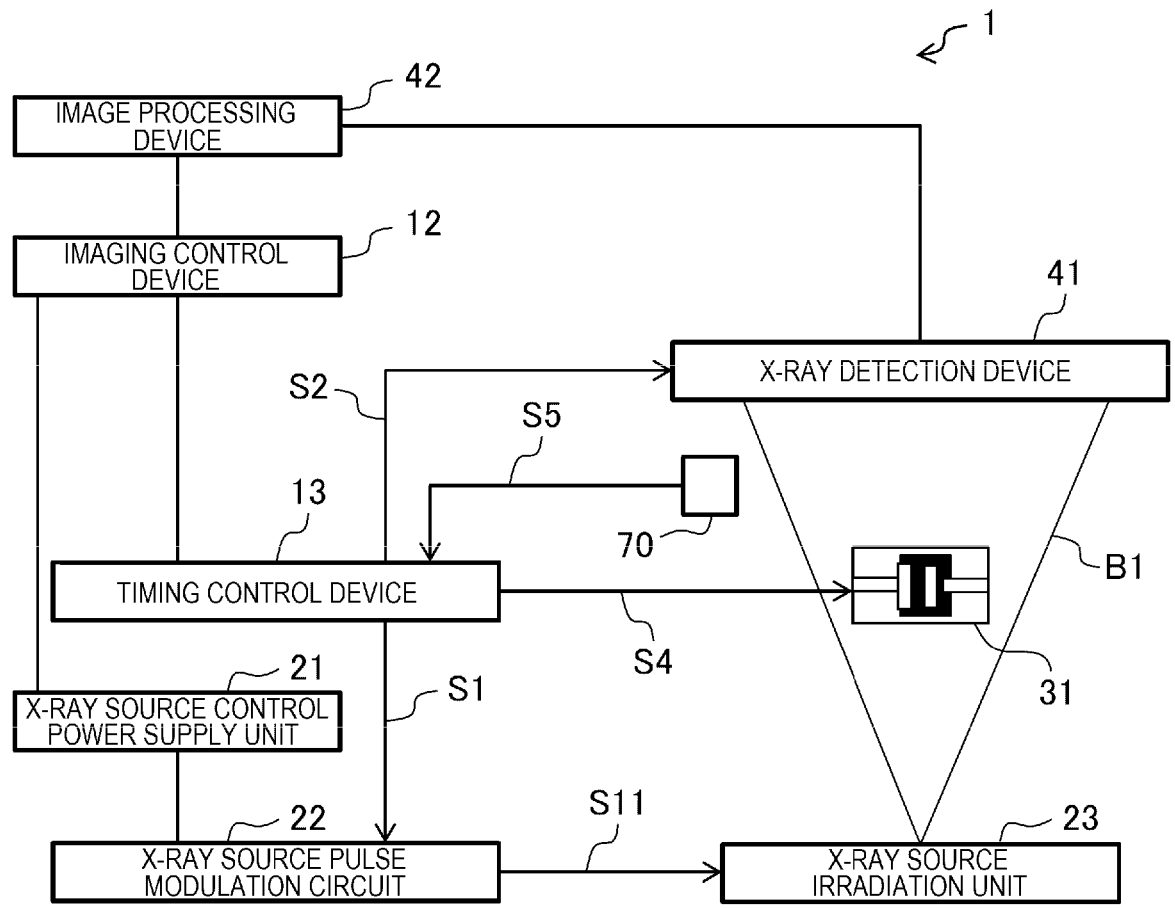
[FIG. 2]
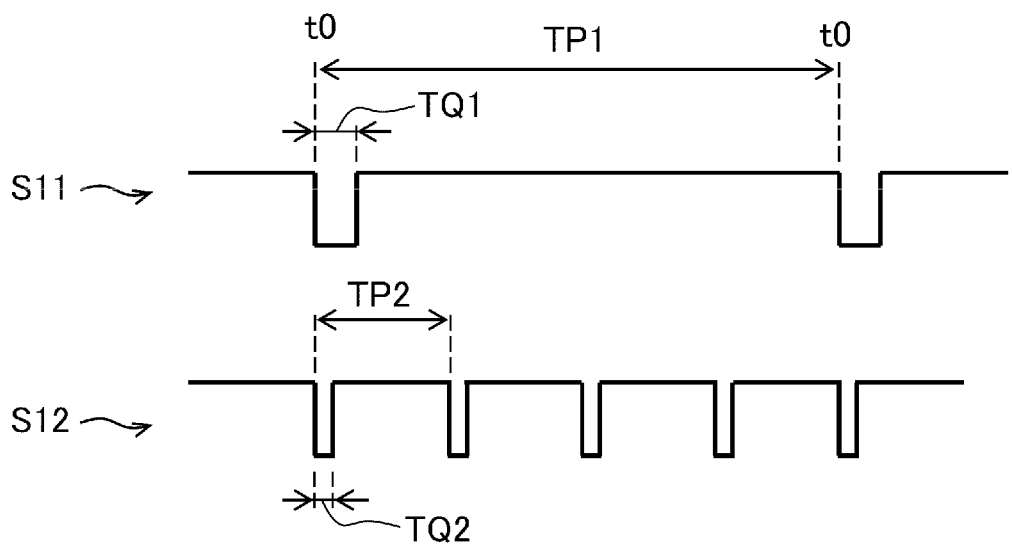

[FIG. 3]
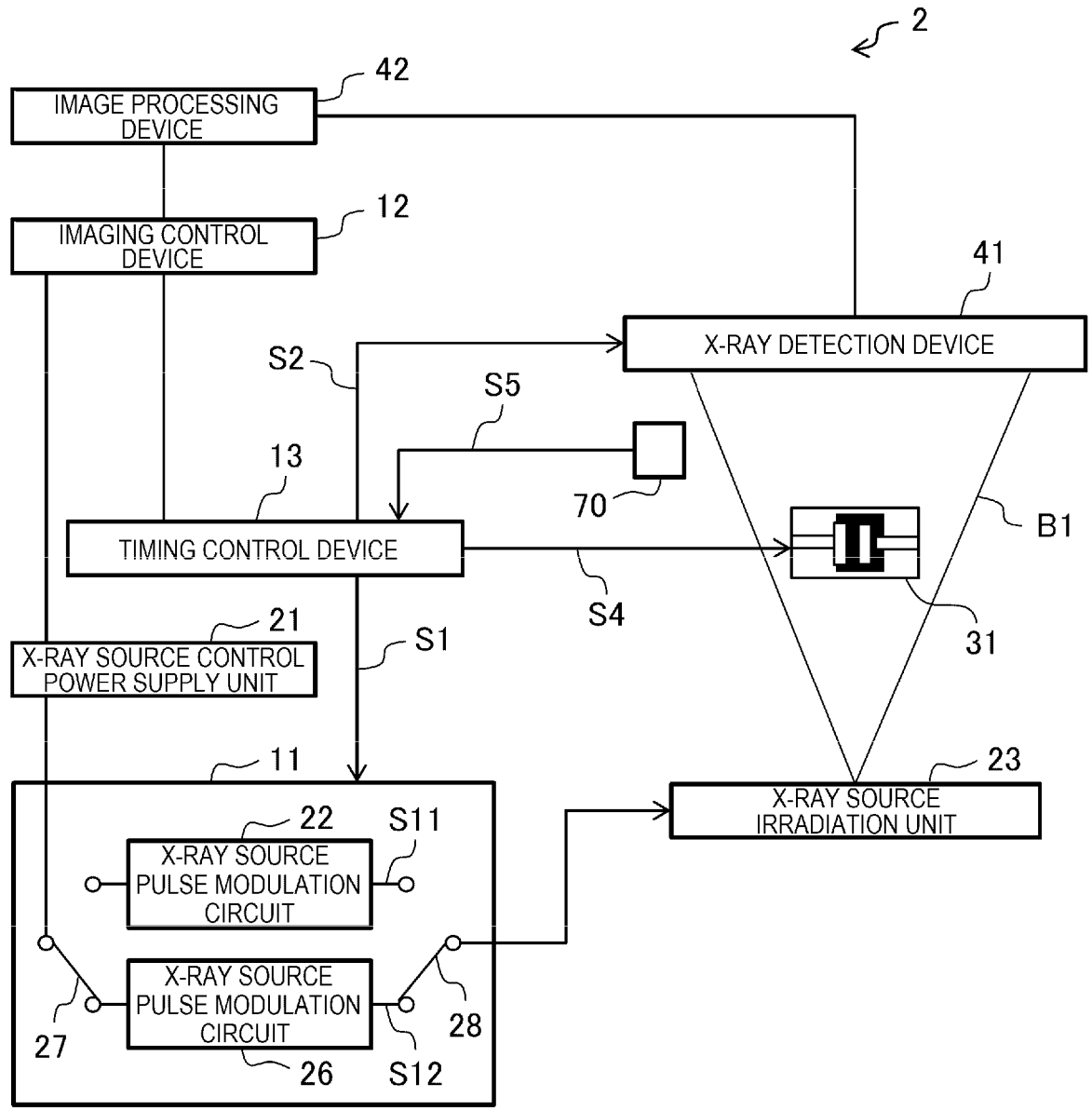

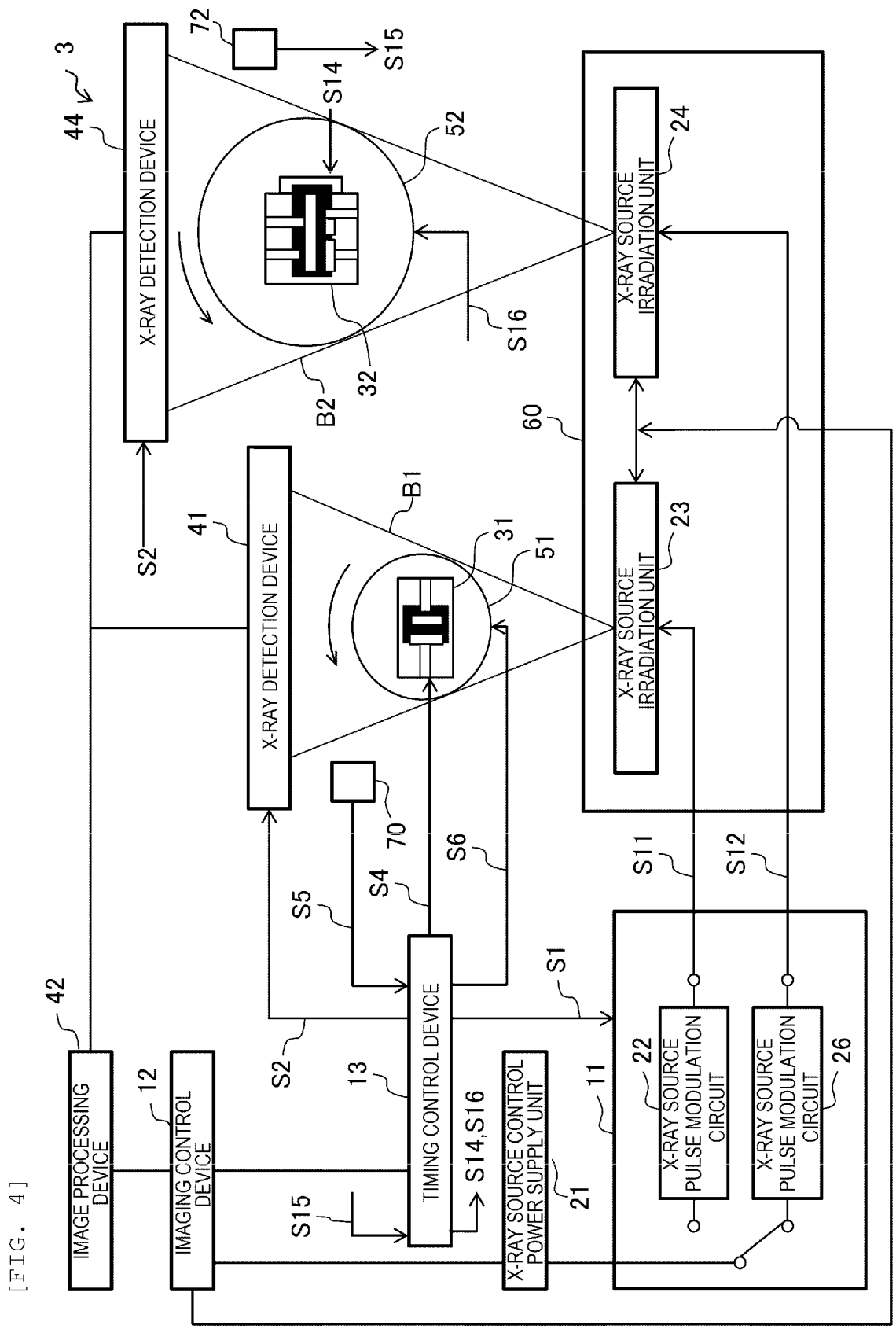
[FIG. 4]

FLUOROSCOPIC IMAGE CAPTURING APPARATUS

TECHNICAL FIELD

The present invention relates to a fluoroscopic image capturing apparatus.

BACKGROUND ART

For example, as shown in the following PTLs 1 and 2, there is a known technique of evaluating, by irradiating a specimen with X-rays from an X-ray source and measuring an intensity of the X-rays transmitted through the specimen while being attenuated in a structure inside the specimen, an internal structure of the specimen.

CITATION LIST

Patent Literature

PTL 1: JP2006-503631A
PTL 2: JP2011-89798A

SUMMARY OF INVENTION

Technical Problem

However, according to the technique described above, it may be difficult to appropriately evaluate the internal structure of the specimen.

The invention has been made in view of circumstances described above, and an object thereof is to provide a fluoroscopic image capturing apparatus capable of appropriately evaluating an internal structure of a specimen.

Solution to Problem

In order to solve the above problem, the invention provides a fluoroscopic image capturing apparatus including: a timing control device configured to output an irradiation timing signal in synchronization with a drive timing signal for driving a specimen or a timing signal as a detection result of an operation of the specimen; an electromagnetic wave generation unit configured to irradiate, in synchronization with the irradiation timing signal, the specimen with a pulsed electromagnetic wave beam having a wavelength with which the electromagnetic wave beam is transmitted through the specimen; and an electromagnetic wave detection device configured to receive the electromagnetic wave beam transmitted through the specimen.

Advantageous Effects of Invention

According to the invention, the internal structure of the specimen can be appropriately evaluated.

BRIEF DESCRIPTION OF DRAWINGS

FIG. 1 is a block diagram of a fluoroscopic image capturing apparatus according to a first embodiment.
FIG. 2 is a waveform diagram of voltage pulses in each embodiment.
FIG. 3 is a block diagram of a fluoroscopic image capturing apparatus according to a second embodiment.
FIG. 4 is a block diagram of a fluoroscopic image capturing apparatus according to a third embodiment.

DESCRIPTION OF EMBODIMENTS

Outline of Embodiments

When the technique according to PTL 1 described above is applied, it is considered that a reduction in temporal resolution and image noise can be avoided by performing interlace using a sub-detector, that is, complementary sampling imaging. However, this method does not effectively function for applications that require high spatial decomposition or for imaging in an operating state of a mechanical component operating at a high speed.

When the technique according to PTL 2 described above is applied, it is considered that behavior of inclusions in a fluid as a specimen can be quantitatively evaluated by emitting pulsed radiation. However, this method is merely for evaluating overall behavior in a macroscopic manner in units of time intervals of several seconds or more. That is, this method is not suitable for an evaluation of a mechanical component that requires high spatial resolution in units of sub-millimeters or an evaluation of a state in which the mechanical component operates at a high speed in units of milliseconds.

Therefore, in embodiments to be described later, even for a mechanical component operating at a high speed, synchronization or correlation between the mechanical component and an imaging timing is obtained using a detection device and a timing control device that are suitable for high-speed imaging. Accordingly, it is possible to implement a fluoroscopic image capturing apparatus capable of evaluating a change in an internal structure thereof with high temporal resolution and high spatial resolution.

More specifically, fluoroscopic image capturing apparatuses according to the embodiments to be described later accurately control the imaging timing of an X-ray fluoroscopic image at a high speed using the detection device and the timing control device that are capable of measuring pulsed X-rays in 5 microseconds or less. Then, in response to a timing signal from the timing control device, the mechanical component as a specimen is driven, and a pulsed X-ray irradiation timing signal and an X-ray transmission detection signal that are in synchronization with the driving operation are generated. Then, by measuring the amount of transmitted X-rays in a predetermined operating state of the specimen, it is possible to quantitatively evaluate, in a non-destructive manner, an internal operating state of the mechanical component operating at a high speed as a target.

First Embodiment

Configuration of First Embodiment

FIG. 1 is a block diagram of a fluoroscopic image capturing apparatus 1 according to a first embodiment.
In FIG. 1, the fluoroscopic image capturing apparatus 1 includes an imaging control device 12, a timing control device 13, an X-ray source control power supply unit 21, an X-ray source pulse modulation circuit 22 (pulse generation unit, electromagnetic wave generation unit), an X-ray source irradiation unit 23 (electromagnetic wave beam irradiation unit, electromagnetic wave generation unit), an X-ray detection device 41 (electromagnetic wave detection device), an image processing device 42, and a sensor unit 70.

The X-ray source control power supply unit 21 applies a power supply voltage of a predetermined high voltage to the X-ray source pulse modulation circuit 22. The X-ray source pulse modulation circuit 22 supplies a high-voltage voltage pulse S11 to the X-ray source irradiation unit 23 by modulating the power supply voltage. The X-ray source irradiation unit 23 is driven by the voltage pulse S11 and irradiates a specimen 31 with an X-ray beam B1 (electromagnetic wave beam). The "X-ray" is, for example, an electromagnetic wave having a wavelength of 0.01 nm or more and less than 10 nm. However, in the present embodiment, X-rays generated by the X-ray source irradiation unit 23 are X-rays having high energy, and have a white spectrum with maximum energy of about 1 MeV to 9 MeV. Therefore, it is not necessary that the specimen 31 is irradiated only with X-rays having a specific wavelength.

The X-ray detection device 41 detects a part of the X-ray beam B1 that is transmitted through the specimen 31. The imaging control device 12 supplies imaging plan data to the image processing device 42. The image processing device 42 generates a fluoroscopic image in which an internal structure of the specimen 31 is evaluated based on the imaging plan data and a detection result of the X-ray detection device 41.

FIG. 2 is a diagram illustrating a waveform example of voltage pulses.

In FIG. 2, the voltage pulse S11 is a pulse having a period TP1 and a pulse width TQ1. The pulse width TQ1 is, for example, about 5 μs (microseconds), and the period TP1 is, for example, about 4 ms (milliseconds). In this case, a device suitable for measuring X-rays having a pulse width of 5 μs or less may be used as the X-ray detection device 41. A voltage pulse S12 illustrated in the drawing is a high-voltage pulse applied to other embodiments to be described later, and details thereof will be described later.

Referring back to FIG. 1, a variable pulse modulation unit 11 supplies an irradiation timing signal S1 for designating an on/off timing of the voltage pulse S11 to the X-ray source pulse modulation circuit 22. The irradiation timing signal S1 is, for example, a pulse signal generated at a generation timing t0 (see FIG. 2) of the voltage pulse S11. The variable pulse modulation unit 11 supplies a detection timing signal S2 for designating a timing at which the X-ray beam B1 is detected to the X-ray detection device 41.

Further, the timing control device 13 supplies a drive timing signal S4 synchronized with the irradiation timing signal S1 to the specimen 31. The drive timing signal S4 is a signal for designating a timing at which the specimen 31 is driven, so that the specimen 31 can be driven in synchronization with the irradiation timing signal S1. However, depending on a type of the specimen 31, it may be impossible or difficult to perform control according to the drive timing signal S4 supplied from the outside. Therefore, in the present embodiment, the sensor unit 70 is provided.

The sensor unit 70 detects an operation state of the specimen 31 and outputs a timing signal S5 synchronized with the operation of the specimen 31. The imaging control device 12 designates whether the signals S1 and S2 are to be synchronized with the timing signal S5 for the timing control device 13. Here, when the imaging control device 12 designates "to be synchronized with the signal S5", the timing control device 13 outputs the signals S1 and S2 in synchronization with the signal S5. Therefore, in this case, the timing control device 13 can also output the irradiation timing signal S1 and the detection timing signal S2 that are synchronized with the operation of the specimen 31.

As an example, it is assumed that the specimen 31 is a solenoid valve that repeats an open state and a closed state in synchronization with the drive timing signal S4. In this case, the imaging control device 12 supplies output timings of the signals S1 and S2 to the timing control device 13, so that the X-ray source irradiation unit 23 emits the X-ray beam B1 at a timing at which the specimen 31 is to be imaged and the X-ray detection device 41 detects the X-ray beam B1 in a periodic operation process of the specimen 31. As an example, it is assumed that the period TP1 is 4 ms and the pulse width TQ1 is 5 μs as illustrated in FIG. 2. Then, the specimen 31 as the solenoid valve repeats opening and closing operations at a period of 4 ms, and can image a desired section among the opening and closing operations with high temporal resolution of 5 μs. Accordingly, it is possible to evaluate reliability of a mechanical component, which is important in terms of engineering, such as repetition accuracy.

Second Embodiment

FIG. 3 is a block diagram of a fluoroscopic image capturing apparatus 2 according to a second embodiment. In the following description, portions corresponding to respective portions according to the first embodiment described above are denoted by the same reference numerals, and description thereof may be omitted.

The fluoroscopic image capturing apparatus 2 has the same configuration as that of the fluoroscopic image capturing apparatus 1 illustrated in FIG. 1, and further includes switches 27 and 28 and an X-ray source pulse modulation circuit 26 (pulse generation unit, electromagnetic wave generation unit). The timing control device 13 supplies the irradiation timing signal S1 to both the X-ray source pulse modulation circuits 22 and 26.

The X-ray source pulse modulation circuit 26 outputs the voltage pulse S12. The switch 27 selects one of the X-ray source pulse modulation circuits 22 and 26 and applies a power supply voltage output from the X-ray source control power supply unit 21. The switch 28 selects one of the voltage pulses S11 and S12 in conjunction with the switch 27, and supplies the selected voltage pulse to the X-ray source irradiation unit 23. Hereinafter, the X-ray source pulse modulation circuits 22 and 26 and the switches 27 and 28 are collectively referred to as a "variable pulse modulation unit 11".

The voltage pulse S12 generated by the X-ray source pulse modulation circuit 26 has a period TP2 and a pulse width TQ2 as illustrated in FIG. 2. The pulse width TQ2 is, for example, about 1.25 μs, and the period TP2 is, for example, about 1 ms.

Each of the X-ray source pulse modulation circuits 22 and 26 includes a plurality of capacitors and at least one coil (none of which are illustrated), and these capacitors and the coil form a network. Here, by appropriately setting capacitance of the capacitors, the number of capacitors, and the winding number of the coil, it is possible to output voltage pulses having desired pulse widths, that is, the voltage pulses S11 and S12 illustrated in FIG. 2. In other words, in order to make a pulse width of the X-rays variable, it is preferable to prepare in advance a plurality of X-ray source pulse modulation circuits appropriately adjusted by the capacitance of the capacitors, the number of capacitors, and the coil as in the variable pulse modulation unit 11 according to the present embodiment, and to exclusively select and use these X-ray source pulse modulation circuits.

When the variable pulse modulation unit 11 outputs the voltage pulse S11 in which, for example, the period TP1=4 ms and the pulse width TQ1=5 μs, since the amount of X-rays generated corresponding to one pulse can be increased, the variable pulse modulation unit 11 is advantageous in that noise of a fluoroscopic image can be prevented. When the variable pulse modulation unit 11 outputs the voltage pulse S12 in which, for example, the period TP2=1 ms and the pulse width TQ2=1.25 μs, an irradiation cycle of the X-ray beam B1 can be increased to 1000 times per second, and a fluoroscopic image having high resolution can be obtained.

Therefore, an optimum voltage pulse among the voltage pulses S11 and S12 may be selected according to a noise ratio, resolution, an operation period of the specimen 31, and the like, which are required for the fluoroscopic image. The imaging control device 12 selects any of the voltage pulses S11 and S12 based on parameters such as temporal resolution, the noise ratio, and a repetition frequency of an operation of the specimen 31, which are required for the acquired fluoroscopic image. Accordingly, the pulse width and the pulse repetition frequency that are optimum for the specimen 31 can be selected, and an optimum fluoroscopic image can be acquired.

In the example illustrated in FIG. 3, the variable pulse modulation unit 11 selects any of two types of voltage pulses S11 and S12, and supplies the selected voltage pulse to the X-ray source irradiation unit 23. Alternatively, the variable pulse modulation unit 11 may select any of three types of voltage pulses or more and supply the selected voltage pulse to the X-ray source irradiation unit 23. In any case, the pulse width (TQ1, TQ2, or the like) may also be shorter as the period (TP1, TP2, or the like) of the voltage pulse is shorter.

Third Embodiment

FIG. 4 is a block diagram of a fluoroscopic image capturing apparatus 3 according to a third embodiment. In the following description, portions corresponding to respective portions according to other embodiments described above are denoted by the same reference numerals, and description thereof may be omitted.

The fluoroscopic image capturing apparatus 3 has the same configuration as that of the fluoroscopic image capturing apparatus 2 illustrated in FIG. 3, and further includes turntables 51 and 52, an X-ray source irradiation unit 24 (electromagnetic wave beam irradiation unit, electromagnetic wave generation unit), an X-ray detection device 44 (electromagnetic wave detection device), an irradiation unit moving mechanism 60, and a sensor unit 72.

Specimens 31 and 32 can be placed on upper surfaces of the turntables 51 and 52 and are rotationally driven by the turntables 51 and 52, respectively. The timing control device 13 supplies pulse signals S6 and S16 that are synchronized with the irradiation timing signal S1 to the turntables 51 and 52, respectively. The turntables 51 and 52 rotate in synchronization with the pulse signals S6 and S16.

The X-ray source irradiation unit 24, the X-ray detection device 44, and the sensor unit 72 have a configuration similar to that of the X-ray source irradiation unit 23, the X-ray detection device 41, and the sensor unit 70, respectively. That is, in the illustrated state, the X-ray source irradiation units 23 and 24 irradiate the specimens 31 and 32 with X-ray beams B1 and B2 (electromagnetic wave beam), respectively, and the X-ray detection devices 41 and 44 detect the X-ray beams B1 and B2 transmitted through the specimens 31 and 32, respectively. The timing control device 13 supplies the detection timing signal S2 to both the X-ray detection devices 41 and 44.

The sensor unit 72 detects an operation state of the specimen 32 and outputs a timing signal S15 synchronized with the operation of the specimen 32 to the timing control device 13. The timing control device 13 supplies a drive timing signal S14 to the specimen 32. The imaging control device 12 designates whether the signals S1 and S2 are to be synchronized with the timing signal S5 or S15 for the timing control device 13.

The turntable 51 can be, for example, a small-sized turntable suitable for imaging the small-sized specimen 31 with high resolution, and the turntable 52 can be, for example, a large-sized turntable suitable for imaging the large-sized specimen 32 with high resolution. In this case, the X-ray detection device 41 may be a small-sized device suitable for the small-sized specimen 31, and the X-ray detection device 44 may be a large-sized device suitable for the large-sized specimen 32.

The irradiation unit moving mechanism 60 can move positions of the X-ray source irradiation units 23 and 24 as necessary. That is, in contrast to the illustrated state, the positions of the X-ray source irradiation units 23 and 24 can be moved, so that the X-ray source irradiation unit 23 irradiates the specimen 32 with the X-ray beam B1 and the X-ray source irradiation unit 24 irradiates the specimen 31 with the X-ray beam B2.

According to the above configuration, the small-sized turntable 51 and the large-sized turntable 52 can rotate in synchronization with irradiation timings of both X-ray beams B1 and B2. Accordingly, X-ray transmission data from all directions can be collected, and not only fluoroscopic images but also tomographic images of the specimens 31 and 32 can be reconstructed by the image processing device 42. That is, by inputting temporal resolution, a sampling interval, spatial resolution, and the like to the imaging control device 12, the imaging control device 12 may select optimum periods TP1 and TP2, the X-ray detection devices 41 and 44, and the turntables 51 and 52 according to attributes such as sizes of the specimens 31 and 32.

In the present embodiment, the turntables 51 and 52 are stopped, and the irradiation timing signal S1 can be supplied to the variable pulse modulation unit 11 in synchronization with the drive timing signals S4 and S14 as in the first and second embodiments. Alternatively, instead of this, the irradiation timing signal S1 may also be output to the variable pulse modulation unit 11 according to the timing signals S5 and S15 detected from the specimens 31 and 32. Accordingly, it is possible to implement an optimum fluoroscopic image and tomographic image capturing apparatus for the specimens 31 and 32.

Effects of Embodiments

As described above, according to the embodiments described above, the fluoroscopic image capturing apparatuses 1, 2, and 3 include: the timing control device 13 that outputs the irradiation timing signal S1 in synchronization with the drive timing signals S4 and S14 for driving the specimens 31 and 32 or the timing signals S5 and S15 as detection results of the operations of the specimens 31 and 32; the electromagnetic wave generation units (22, 26, 23, and 24) that irradiate, in synchronization with the irradiation timing signal S1, the specimens 31 and 32 with pulsed electromagnetic wave beam (B1, B2) having a wavelength with which the electromagnetic wave beam is transmitted through the specimens 31 and 32; and the electromagnetic wave detection device (41, 44) that receives the electromagnetic wave beam (B1, B2) transmitted through the specimens 31 and 32.

Accordingly, internal structures of the specimens 31 and 32 can be appropriately evaluated. Specifically, an internal state of an operation state can be visualized by the spatial resolution or the temporal resolution that are required for the specimens 31 and 32 such as mechanical components. Further, by using the electromagnetic wave detection device (41, 44) suitable for high-speed imaging and the timing control device 13, the operations of the specimens 31 and 32 can correlate with imaging timing, and the internal structures of the specimens 31 and 32 can be evaluated with high temporal resolution and high spatial resolution.

As in the fluoroscopic image capturing apparatuses 2 and 3, the electromagnetic wave generation units (22, 26, 23, and 24) preferably include a plurality of pulse generation units (22, 26) that generate a plurality of voltage pulses (S11, S12) having different periods TP1 and TP2 and different pulse widths TQ1 and TQ2, and the electromagnetic wave beam irradiation unit (23, 24) that generates the electromagnetic wave beam (B1, B2) according to any of the plurality of voltage pulses (S11, S12). Accordingly, an optimum voltage pulse (S11, S12) can be selected according to the specimens 31 and 32.

It is more preferable that the plurality of pulse generation units (22, 26) are set such that the pulse widths TQ1 and TQ2 are shorter as the periods TP1 and TP2 are shorter.

Accordingly, it is possible to generate the electromagnetic wave beam (B1, B2) having energy according to a capability of the electromagnetic wave generation units (22, 26, 23, and 24).

As in the fluoroscopic image capturing apparatus 3, it is more preferable that the fluoroscopic image capturing apparatus 3 further includes the turntables 51 and 52 that rotationally drive the specimens 31 and 32 mounted on the turntables 51 and 52, and that the timing control device 13 further has a function of generating the irradiation timing signal S1 in synchronization with rotation of the turntables 51 and 52. Accordingly, tomographic images can also be captured in addition to the fluoroscopic images of the specimens 31 and 32.

In the fluoroscopic image capturing apparatus 3, it is more preferable that a plurality of turntables 51 and 52 are provided, and that the irradiation unit moving mechanism 60 that moves the electromagnetic wave beam irradiation units (23, 24) to a side on which the specimens 31 and 32 are mounted among the plurality of turntables 51 and 52 is further provided. Accordingly, it is possible to select and apply the turntables 51 and 52 and the electromagnetic wave beam irradiation units (23, 24) that are optimum for the specimens 31 and 32.

MODIFICATIONS

The invention is not limited to the embodiments described above, and various modifications can be made. The embodiments described above are examples for easy understanding of the invention, and are not necessarily limited to those including all the configurations described above. A part of a configuration according to one embodiment can be replaced with a configuration according to another embodiment, and a configuration according to one embodiment can also be added to a configuration according to another embodiment. A part of a configuration according to each embodiment may be deleted, or may be added or replaced with another configuration. Control lines and information lines illustrated in the drawings are considered to be necessary for explanation, and all the control lines and information lines required on a product are not necessarily illustrated. Actually, it may be considered that almost all the configurations are connected to each other. A modification that can be applied to the embodiments described above is, for example, as follows.

(1) In the fluoroscopic image capturing apparatuses 1, 2, and 3 according to the embodiments described above, the X-ray source irradiation units 23 and 24 irradiate the specimens 31 and 32 with X-rays as, for example, electromagnetic waves having a wavelength of 0.01 nm or more and less than 10 nm. Alternatively, the specimens 31 and 32 may be irradiated with y-rays having a wavelength of less than 0.01 nm instead of X-rays, may be irradiated with ultraviolet rays having a wavelength of 10 nm or more and less than 380 nm, or may be irradiated with electromagnetic waves in other wavelength ranges as long as the electromagnetic waves are transmitted through the specimens 31 and 32.

REFERENCE SIGNS LIST 1, 2, 3: fluoroscopic image capturing apparatus
13: timing control device
22, 26: X-ray source pulse modulation circuit (pulse generation unit, electromagnetic wave generation unit)
23, 24: X-ray source irradiation unit (electromagnetic wave beam irradiation unit, electromagnetic wave generation unit)
31, 32: specimen
41, 44: X-ray detection device (electromagnetic wave detection device)
51, 52: turntable
60: irradiation unit moving mechanism
B1, B2: X-ray beam (electromagnetic wave beam)
S1: irradiation timing signal
S4, S14: drive timing signal
S5, S15: timing signal
S11, S12: voltage pulse
TP1, TP2: period
TQ1, TQ2: pulse width

The invention claimed is:
1. A fluoroscopic image capturing apparatus comprising:
a timing control device configured to output an irradiation timing signal in synchronization with a drive timing signal for driving a specimen or a timing signal as a detection result of an operation of the specimen;
an electromagnetic wave generation unit configured to irradiate, in synchronization with the irradiation timing signal, the specimen with a pulsed electromagnetic wave beam having a wavelength with which the electromagnetic wave beam is transmitted through the specimen; and
an electromagnetic wave detection device configured to receive the electromagnetic wave beam transmitted through the specimen,
wherein the electromagnetic wave generation unit includes a plurality of pulse generation units configured to generate a plurality of voltage pulses having different periods and different pulse widths, and an electromagnetic wave beam irradiation unit configured to generate the electromagnetic wave beam according to any of the plurality of voltage pulses.

2. The fluoroscopic image capturing apparatus according to claim 1,
   wherein the plurality of pulse generation units are set such that the pulse widths are shorter as the periods are shorter.

3. The fluoroscopic image capturing apparatus according to claim 2, further comprising:
   a turntable configured to rotationally drive the specimen mounted on the turntable,
   wherein the timing control device further has a function of generating the irradiation timing signal in synchronization with rotation of the turntable.

4. The fluoroscopic image capturing apparatus according to claim 3, further comprising:
   a plurality of turntables including the turntable; and
   an irradiation unit moving mechanism configured to move the electromagnetic wave beam irradiation unit to a side on which the specimen is mounted among the plurality of turntables.

* * * * *